(12) United States Patent
Elmer et al.

(10) Patent No.: US 7,432,316 B2
(45) Date of Patent: Oct. 7, 2008

(54) INKJET INKS, METHODS FOR APPLYING INKJET INK, AND ARTICLES PRINTED WITH INKJET INK

(75) Inventors: Rick A. Elmer, Brookline, MO (US); Brian Salisbury, Hanover, MA (US); Huck Hyde, Springfield, MO (US); Mark Barnett, Pembroke, MA (US)

(73) Assignee: Gem Gravure Company, Inc., West Hanover, MA (US)

( * ) Notice: Subject to any disclaimer, the term of this patent is extended or adjusted under 35 U.S.C. 154(b) by 703 days.

(21) Appl. No.: 10/980,753

(22) Filed: Nov. 3, 2004

(65) Prior Publication Data

US 2005/0101694 A1 May 12, 2005

Related U.S. Application Data

(60) Provisional application No. 60/516,686, filed on Nov. 3, 2003, provisional application No. 60/517,756, filed on Nov. 6, 2003.

(51) Int. Cl.
*C09D 11/00* (2006.01)

(52) U.S. Cl. ..................... 523/160; 523/161

(58) Field of Classification Search .............. 523/160, 523/161
See application file for complete search history.

(56) References Cited

U.S. PATENT DOCUMENTS

| 4,168,254 | A | | 9/1979 | Fell |
| 4,195,104 | A | | 3/1980 | Fell |
| 4,834,799 | A | | 5/1989 | Song |
| 4,892,775 | A | | 1/1990 | Song |
| 4,975,117 | A | | 12/1990 | Tabayashi et al. |
| 5,594,044 | A | | 1/1997 | Yang |
| 5,825,391 | A | | 10/1998 | Yang |
| 6,010,564 | A | | 1/2000 | Zhu et al. |
| H2113 | H | * | 1/2005 | Nichols et al. ............... 523/160 |
| 7,115,161 | B2 | * | 10/2006 | Magdassi et al. ......... 106/31.25 |

* cited by examiner

*Primary Examiner*—Edward J Cain
(74) *Attorney, Agent, or Firm*—Hamilton, Brook, Smith, & Reynolds, P.C

(57) ABSTRACT

Inkjet inks that include a solvent, a thermoplastic resin, a urethane resin, a first colorant, and a second colorant. When printed onto a surface of an article, the first and second colorant migrate into the article, thereby producing a resilient image. Also described methods of applying indicia with the inkjet inks and articles that include an image printed with the inkjet inks.

39 Claims, No Drawings

INKJET INKS, METHODS FOR APPLYING INKJET INK, AND ARTICLES PRINTED WITH INKJET INK

RELATED APPLICATIONS

This application claims the benefit of U.S. Provisional Application No. 60/516,686, filed on Nov. 3, 2003, as well as the benefit of U.S. Provisional Application No. 60/517,756, filed on Nov. 6, 2003. The entire teachings of these applications are incorporated herein by reference.

BACKGROUND OF THE INVENTION

Inkjet printing techniques are of increasing importance. In general, such techniques impose rigid requirements on ink compositions. Suitable inks for use in inkjet printing techniques are formulated with consideration of many different physical characteristics, including viscosity, resistivity, solubility, and wettabilty. The various components of the ink should be chemically compatible, relatively quick drying, and smear resistant. The ink composition should also minimize clogging of an inkjet nozzle and permit rapid clean-up of the inkjet machine components with minimum effort.

In addition to these factors, formulation of suitable inks should consider additional factors specific to a given application. The type of material to which the ink is applied and the environment in which the printed material is used will also affect the formulation of suitable inkjet inks. For example, printing symbols or words on the polymeric insulation of electrical wiring (e.g., cross-linked polyethylene) is often problematic. In order to protect the wiring from harsh environmental conditions (e.g., high temperatures and exposure to various chemicals such as gasoline, diesel, oil, antifreeze, and brake fluid), the polymeric insulation material is often chemically inert with a non-polar surface chemistry. Inks suitable for labeling the wires must both adhere to these polymeric insulation materials and be able to withstand the harsh environmental conditions. Currently, inkjet inks must undergo either or both a pretreatment process (e.g., those that use a corona, a plasma, or a flame) or post-treatment process (e.g., cross-linking the deposited inky with the use of thermal or UV radiation). Such pre- and post-treatments add processing steps that increase costs and productivity.

There exists a need for an ink that adheres to polymeric materials and leaves an identifiable indicia after exposure to harsh environmental conditions with fewer or no pre- and post-treatment processes.

SUMMARY OF THE INVENTION

The present invention relates to an inkjet ink which adheres to polymeric materials (e.g., polyethylene, high-density polyethylene, cross-linked polyethylene, and polymeric wire insulation material) and provides indicia that is still identifiable or detectable after prolonged exposure to harsh environments.

In some embodiments, this invention features an inkjet ink composition that includes a solvent, a thermoplastic resin, a urethane resin, and a first colorant and a second colorant, wherein the first colorant is solvent black 3 and the second colorant is less oleophilic than the first colorant. In some embodiments, the second colorant is more polar than the first colorant.

In other embodiments, this invention features a method of applying indicia to a substrate that include the steps of directing a stream of ink droplets to the substrate and directing the stream electronically so that the droplets form at least one printed image on the substrate, thereby applying indicia to the substrate. The ink droplets include a solvent, a thermoplastic resin, a urethane resin, a first colorant, and a second colorant. The first colorant is solvent black 3 and the second colorant is less oleophilic than the first colorant.

In further embodiments, this invention features an article that includes a polymeric layer with a surface and a subsurface portion, an image printed on the surface through the deposition of an inkjet ink, and the image marked in the subsurface portion by diffusion of the first colorant and the second colorant into the polymeric layer. The inkjet ink deposited on the surface includes a thermoplastic resin, a urethane resin, a first colorant, and a second colorant. The first colorant and second colorant are diffused into the subsurface portion of the polymeric layer, thereby marking the image on the in the subsurface portion.

In still further embodiments, this invention features an inkjet ink composition that includes a solvent, a thermoplastic resin, a urethane resin, a first colorant, and a second colorant. The first colorant is selected from the group consisting of solvent black 5, solvent black 7, solvent orange 22, solvent yellow 14, solvent yellow 16, solvent yellow 29, solvent yellow 30, solvent yellow 56, solvent blue 5, solvent red 3, solvent red 18, solvent red 24, solvent red 27, solvent red 35, and solvent red 49, and the second colorant is less oleophilic than the first colorant.

In other embodiments, this invention features a method of applying indicia to a substrate that includes the steps of directing a stream of ink droplets to the substrate and directing the stream electronically so that the droplets form at least one printed image on the substrate, thereby applying indicia to the substrate. The ink droplets include a solvent, a thermoplastic resin, a urethane resin, a first colorant, and a second colorant. The first colorant is selected from the group consisting of solvent black 5, solvent black 7, solvent orange 22, solvent yellow 14, solvent yellow 16, solvent yellow 29, solvent yellow 30, solvent yellow 56, solvent blue 5, solvent red 3, solvent red 18, solvent red 24, solvent red 27, solvent red 35, and solvent red 49, and the second colorant is less oleophilic than the first colorant.

In still other embodiments, this invention features an inkjet ink composition that includes a solvent, a thermoplastic resin, a urethane resin, a first colorant, and a second colorant. The first colorant is selected from the group consisting of solvent black 3, solvent black 5, solvent black 7, solvent orange 22, solvent yellow 14, solvent yellow 16, solvent yellow 29, solvent yellow 30, solvent yellow 56, solvent blue 5, solvent red 3, solvent red 18, solvent red 24, solvent red 27, solvent red 35, and solvent red 49, and the second colorant is more polar than the first colorant.

In other embodiments, this invention features a method of applying indicia to a substrate that includes the steps of directing a stream of ink droplets to the substrate and directing the stream electronically so that the droplets form at least one printed image on the substrate, thereby applying indicia to the substrate. The ink droplets include a solvent, a thermoplastic resin, a urethane resin, a first colorant, and a second colorant. The first colorant is selected from the group consisting of solvent black 3, solvent black 5, solvent black 7, solvent orange 22, solvent yellow 14, solvent yellow 16, solvent yellow 29, solvent yellow 30, solvent yellow 56, solvent blue 5, solvent red 3, solvent red 18, solvent red 24, solvent red 27, solvent red 35, and solvent red 49, and the second colorant is more polar than the first colorant.

This invention provides for labeling or placing indicia (e.g., symbols or words made with an inkjet printing process)

on polymeric materials that will adhere and/or be identifiable or detectable in harsh environments with few or no pretreatment processes (e.g., pretreatment with a corona, a plasma, or a flame) or post-treatment processes (e.g., cross-linking deposited ink by exposure to thermal or UV radiation). This allows for savings in processing costs and increased productivity. This invention also provides for inks which can adhere to flexible substrates such as, for example, polymeric insulation on electrical wires.

DETAILED DESCRIPTION OF THE INVENTION

A description of preferred embodiments of the invention follows. While this invention has been particularly shown and described with references to preferred embodiments thereof, it will be understood by those skilled in the art that various changes in form and details may be made therein without departing from the scope of the invention encompassed by the appended claims.

The inkjet inks of the present invention comprises a solvent, a thermoplastic resin, a urethane resin, and at least two colorants. Optionally, the inkjet inks include at least one conductivity agent, at least one wetting agents, and/or at least one pigment. The inks of the present invention are suitable for deposition onto a substrate (e.g., a substrate that includes a polymeric material, such cross-linked polyethylene or a polymeric insulated electrical wire) using inkjet printing methods and devices.

In some embodiments, the liquid inkjet ink has a viscosity in the range of from about 1.5 to about 10 centipoise at about room temperature, preferably in the range of from about 2 to about 6 centipoise at about room temperature. In other embodiments, the liquid inkjet ink has a conductivity in the range of from about 500 to about 2,000 microsiemens per centimeter. In still more embodiments, the liquid inkjet ink is substantially devoid of any solid particles having a diameter of more than about 10 micrometers. In yet more embodiments, the average particle size of any solid particles in the liquid inkjet ink is about 1 micrometer or less.

Solvent

The ink includes one or more solvents which dissolve the other components so that the resulting ink is a homogeneous liquid. Once the ink is applied to a substrate or article, the solvent provides the ink with an accelerated drying time. Suitable solvents include lower aliphatic monohydric alcohols (e.g., methanol, ethanol, or propanol), low molecular weight glycol ethers (e.g., ethylene glycol monomethyl ethers, ethylene glycol monoethyl ethers, propylene glycol monomethyl ethers, and propylene glycol monoethyl ethers), ketones having 3 to 8 carbon atoms (e.g., methyl ethyl ketone, 2-heptanone, pentanone, 2-butanone, and 2-hexanone), acetates, water, those solvents that are known in the art to be suitable for use as solvents in inkjet inks, and combinations thereof. Preferably, the solvent includes methyl ethyl ketone, which is especially useful for its solvating ability and relatively quick drying time.

The exact amount or type of solvent(s) included in the ink will vary with the demands of the a given application. Examples of suitable amounts of solvent(s) include from about 50 percent by weight of the final ink formulation to about 90 percent by weight of the final ink formulation. Preferably, the solvent(s) are present in the final ink formulation in a range of from about 65 percent by weight of the final ink formulation to about 85 percent by weight of the final ink formulation.

Thermoplastic Resin

The ink includes one or more thermoplastic resins or binders. The thermoplastic resin improves the adhesion of the ink to a substrate (e.g., the polymer insulation of an electrical wire) and increases the hardness of the deposited ink. Acceptable thermoplastic resins include nitrocellulose, nitrocellulose with a urethane, and acrylic resins. Preferably, the thermoplastic resin is an acrylic resin.

Examples of suitable acrylic resins are available from Neoresins, Inc. (Wilmington, Mass.), Rohm & Haas Co. (Philadelphia, Pa.), ICI Acrylics, Inc. (Wilmington, Del.), and Dianal America, Inc. (Pasadena, Tex.). Suitable acrylic resins include, for example, various thermoplastic acrylics (e.g., the reaction product of many different acrylics such as methyl methacrylic, acrylic acid, butyl methacrylate, ethyl methacrylate, polybutyl acrylate, and ethylacrylate). Preferably, lower molecular weight acrylics are used to keep the viscosity in the proper range and have adequate binder for the colorants. As used herein, "lower molecular weight acrylics" refer to acrylic resins having a molecular weight average ($M_w$) of about 75,000 or less. An example of a lower molecular weight acrylic is Neocryl™ brand acrylic B-814 from Neoresins, Inc. Neocryl™ B-814 has a glass temperature of about 52° C., a molecular weight average of about 45,000, and contains ethyl acrylate, ethyl methacrylate, and methyl methacrylate.

The exact amount or type of thermoplastic resin(s) included in the ink will vary with the needs of a given application. Examples of suitable amounts of thermoplastic resin(s) include from about 2 percent by weight of the final ink formulation to about 15 percent by weight of the final ink formulation. Preferably, the thermoplastic resin(s) makes up from about 2 percent by weight of the final ink formulation to about 6 percent by weight of the final ink formulation.

Urethane Resin

The ink includes at least one plasticizer or soft flexible binder such as, for example, urethane resins or binders. Urethane resins impart flexibility to the ink, which is advantageous when the ink is deposited on a flexible substrate (e.g., high cross-linked polyethylene). Also, the urethane resins provide for more intimate contact between the colorants and the substrate material, thereby allowing the first and second colorants to diffuse into the substrates at a faster rate than would be obtained from inks lacking the urethane resin. Preferably, the urethane resins are fully reacted urethanes with fairly high elongations and very low glass temperatures (e.g., ~0° C.). The urethane resin is chemically compatible with the thermoplastic resin so as to allow the urethane and thermoplastic resins to be mixed without substantial cross-reactivity between the two resins and to allow for good blending and intertwining.

The exact amount or type of urethane resin(s) included in the ink will vary with the needs of a given application, but the amount should be sufficient to provide the dried ink with the flexibility desired without causing the surface to be tacky. Typically, the amount of urethane resin(s) included in the ink is in the range of about 40 percent by weight of the thermoplastic resin(s) to about 150 percent by weight of the thermoplastic resin(s). Preferably, the amount of urethane resin(s) included in the ink is in the range of about 50 percent by weight of the thermoplastic resin(s) to about 100 percent by weight of the thermoplastic resin(s).

Suitable urethane resins are available commercially. Examples of suitable urethane resins include K-Plast 1022, 1044, and 1055 (available from Kane International, Tampa, Fla.) and Neorez™ urethanes U-7611 and U-351 (available from Neoresins, Inc.).

Colorants

At least two colorants or dyes are included in the inkjet ink. While the ink of the present invention is able to resist exposure to harsh environmental conditions such as, for example, high temperatures and/or exposure to chemicals that degrade or dissolve inks (e.g., gasoline, diesel, oil, antifreeze, and brake fluid), prolonged exposure to such conditions will eventually degrade or dissolve significant portions of the deposited ink. To alleviate this problem, the inks of the present invention include a first colorant that is able to stain the substrate material. So in addition to forming indicia on the surface of a substrate, the indicia are also inscribed in the substrate material itself. In this way, the indicia will still be detectable if the significant portions and/or components of the deposited ink are removed by exposure to harsh environmental conditions. The urethane resin in the ink enhances the intimate contact of the ink with the surface of a substrate on which the ink is deposited, allowing the colorants to penetrate into the polymeric substrate.

For example, the ink of the present invention could be used to label an electrical wire inside of an engine. Initially, the indicia on the wire would be clearly discernable. Even during routine operation of the engine, the insulated wire may be exposed to high temperatures and degrading chemicals (e.g., gasoline, diesel, oil, antifreeze, and brake fluid). Initially, the indicia will be discernable because the ink layer will resist such harsh environmental conditions for a period of time. However, eventually those conditions will degrade, dissolve, or wear away a significant portion of the ink layer from the substrate. Even with this gradual wear, the indicia will still be apparent because a sufficient portion of the first colorant has migrated into the substrate and inscribed the indicia into the substrate material itself.

Specific dyes suitable for use as the first colorant will vary with a given application. One factor in selecting the suitable first colorant is the material composition of the substrate the ink is to be deposited upon. In some embodiments, the dye(s) of the first colorant are oil and fat colors, meaning the dyes have an affinity for oil and fat materials. This affinity provides for increased diffusion into a polymeric substrate. Another factor that will affect the selection of suitable ink is the temperature at which it will be applied to the polymeric substrate during the inkjet printing process.

The dye should also be selected so that it will migrate or pass into the polymeric material within a suitable period of time, thereby providing indicia adequately discernable for a given application. Usually the dye of the first colorant is selected so that an amount sufficient to form a legible indicia will migrate into the polymeric material within about 24 hours at about room temperature, and especially within about 4 hours at about room temperature.

Specific examples of suitable dyes include solvent black 3 (e.g., Orient™ Oil Black 860 available from Orient Chemical Corporation, Springfield, N.J.), solvent black 5, solvent black 7, solvent orange 22, solvent yellow 14, solvent yellow 16, solvent yellow 29, solvent yellow 30, solvent yellow 56, solvent blue 5, solvent red 3, solvent red 18, solvent red 24 (available as Orient™ Oil Red RR from Orient Chemical Corporation), solvent red 27 (available as Orient™ Oil Red 5B from Orient Chemical Corporation), solvent red 35, and solvent red 49.

The exact type or amount of first colorant included in the ink will vary with the needs of a given application. Examples of suitable amounts of first colorant include from about 0.5 percent by weight of the final ink formulation to about 10 percent by weight of the final ink formulation. Preferably, the first colorant is present in the final ink formulation in a range from about 1 percent by weight of the final ink formulation to about 4 percent by weight of the final ink formulation.

Over longer periods of time and/or elevated temperatures, the first colorant will continue to diffuse or migrate further into the substrate material. Eventually, even the inscribed indicia of the diffused first colorant will become blurred or faint so as to render the stained indicia of the first colorant undetectable. To ensure that the indicia on the substrate will continue to be discernable, a second colorant is included in the ink. The dye of the second colorant has less affinity for the substrate material. Like the first colorant, the second colorant stains the substrate material. However, the second colorant stains the substrate material over a longer time period than the first colorant (e.g., over periods of time greater than 24 hours).

Also like the first colorant, the exact dye used as a second colorant will depend upon the given application and/or the substrate material onto which the ink will be deposited. In some embodiments, the dye of the second colorant is more soluble in alcohol than the dye of the first colorant, indicating that the second colorant dye has less affinity for diffusing into a polymeric material than the first colorant dye. In further embodiments, the dye of the second colorant is more polar and/or less oleophilic than the dye of the first colorant.

Examples of suitable dyes for use as a second colorant include solvent black 27, solvent black 29 (available as Orasol™ Black RLI from Ciba Specialty Chemicals, Tarrytown, N.Y.), solvent black 34, solvent red 8, solvent red 122, solvent red 132, solvent red 218, solvent blue 38, and solvent blue 70. In accelerated aging tests at 60° C., the second colorant has been found to remain legible long after a first colorant of solvent black 3 has faded (e.g., between about 24 to about 48 hours longer during some of the tests conducted). Additionally, it was found that Orasol™ RLI stains cross-linked polyethylene sufficiently to allow indicia to remain discernable for a signification period of time after exposure to the harsh chemicals described earlier.

The exact type or amount of second colorant included in the ink will vary with the needs of a given application. Examples of suitable amounts of second colorant dye include from about 0.5 percent by weight of the final ink formulation to about 10 percent by weight of the final ink formulation. Preferably, the amount of second colorant included in the final ink formulation ranges from about 1 percent by weight of the final ink formulation to about 4 percent by weight of the final ink formulation.

In some extreme heat conditions (e.g., above about 150° C.), even the indicia of the second colorant will eventually fade. Optionally in these extreme conditions, a third colorant is used to ensure that the indicia are legible or discernable for a significant period of time after both the first and second colorants have faded. The third colorant is a pigment that will not substantially migrate into the material of the substrate. As used herein, a "pigment" is distinct from a "dye." A "dye" is a colored liquid that forms a homogenous solution with the rest of the liquid ink, while a "pigment" comprises a fine colored solid which does not dissolve completely into the liquid ink. An ink of this invention that includes the optional third colorant is not a homogenous solution, but a fine suspension suitable for deposition in an inkjet printing process.

The third colorant will adhere onto the substrate material, even after exposure to harsh chemicals, because the extreme environmental temperatures will bake the third colorant onto the substrate material. So while the harsh chemicals can eventually remove the other components of the ink and high temperatures can eventually obliterate the indicia of the diffused first and second colorants, the pigments of the third colorants will remain because the pigment particles become fused to the polymeric material. In this manner, the inks of this invention are able to provide discernable indicia on polymeric materials that are exposed to extreme environmental temperatures.

The exact pigment chosen as a third colorant will vary with the given application and the material onto which the ink is to be deposited. Examples of suitable pigments include carbon black (e.g., Raven™ 1040, available from Columbia Chemicals, Atlanta, Ga.) as well as other suitable pigments as known in the art.

As with the first and second colorants, the exact amount of third colorant included in the ink will vary with the needs of a given application. Examples of suitable amounts of third colorant pigment in the final ink formulation include a range from about 0.5 percent by weight of the final ink formulation to about 10 percent by weight of the final ink formulation. Preferably, the amount of third colorant pigment included in the final ink formulation ranges from about 1 percent by weight of the final ink formulation to about 4 percent by weight of the final ink formulation.

Conductivity Agents

Conductivity agents are included to impart sufficient conductivity in the ink so as to allow for the use of the ink in a continuous inkjet machine. Examples of suitable conductivity agents include tetrabutyl ammonium nitrate, tetrabutyl ammonium hexafluorophosphate, potassium thiocyanate, and other conductivity agents known in the art.

The exact amount or type of conductivity agent(s) included in the ink will vary with the needs of a given application. Examples of suitable amounts of conductivity agent(s) included in the final ink formulation include a range from about 0.2 percent by weight of the final ink formulation to about 3 percent by weight of the final ink formulation. Preferably, the amount of conductivity agent(s) included in the final ink formulation is a range from about 0.5 percent by weight of the final ink formulation to about 1.5 percent by weight of the final ink formulation.

Wetting Agents

Wetting agents are optionally included in the ink to improve wetting the ink to the substrate. Since there are a wide variety of substrates and possible ink compositions, a wide variety of wetting agents are suitable for use in this invention. Examples of suitable wetting agents include fluorinated surfactants, such as Zonyl™ FSO (available from E. I. Du Pont de Nemours and Company, Wilmington, Del.) as well as those wetting agents known in the art.

The exact amount or type of wetting agent(s) included in the ink will vary with the needs of a given application. Examples of suitable amounts of wetting agent(s) to include in the final ink formulation include a range from about 0.5 percent by weight of the final ink formulation to about 1.5 percent by weight of the final ink formulation.

To form the ink, the various components are mixed together in the desired proportions. The order in which they are mixed is not critical, however, they are preferably mixed in the order in which they are described herein. That is, the hard thermoplastic resin is mixed into the solvent and the remaining components are added in order of the urethane resin, the colorants, the conductivity agents, and finally the wetting agents (if the wetting agents are used).

The various components of the ink should be selected in order to provide acceptable adhesion and indicia for a given application and the exact amounts and types of the various components will vary depending upon the needs of that application. Also, the components should be chemically compatible in the mixture so that all the components are able to dissolve (with the exception of the pigment of the third colorant, which should be a fine enough suspension to allow depostion of the ink) and form a solution suitable for dispersion through an inkjet application process.

The pigment of the third colorant should be selected so that the pigment particles are dispersed in a fine suspension suitable for dispersion through an inkjet application. Preferably, a the third colorant solution is prepared separately, and that solution is added to the ink. The solid pigment material should be milled to a very fine powder so that the bulk of the solid particles are small enough to pass through the print head of an inkjet printer. This fine powder of solid pigment material is then mixed with a solvent, a thermoplastic resin, and a dispersant. Preferably, the solvent and thermoplastic resin used in the third colorant solution are the same as that used in the remainder of the ink composition. One example of a composition of a third colorant solution is about 20% by weight pigment powder, about 44% by weight methyl ethyl ketone, about 20% by weight n-butylacetate, and about 16% by weight of a dispersant (e.g., Solsperse™ 3250, available from Avecia, Inc., Wilmington, Del.). The third colorant solution is then added to the ink solution. Before using an ink solution that includes the pigment of the third colorant, it is prudent to filter the ink to remove those pigment particles that will obstruct an inkjet printhead. A 1 micrometer filter should suffice.

In other embodiments, this invention includes a method of applying indicia to a substrate using inkjet inks of the invention. The methods comprise the steps of directing a stream of ink droplets to the substrate, wherein said ink droplets include a solvent, a thermoplastic resin, a urethane resin, and at least two colorants, and controlling the direction of the stream electronically so that the droplets form at least one printed image on the substrate, thereby applying indicia to the substrate. In some embodiments, the second colorant diffuses less readily into the substrate than the first colorant. In some embodiments, the second colorant diffuses less readily into the substrate because it is less oleophilic and/or more polar than the first colorant. Optionally, the first colorant is solvent black 3. Examples of suitable substrates include polymeric materials, such as the polymeric insulation of flexible wires. In further embodiments, the inkjet ink includes a third colorant.

The first colorant diffuses or migrates into the substrate, thereby embedding or marks a portion of the substrate. In some embodiments, enough of the first colorant diffuses into the substrate to impart the substrate with a visible indicia in less than 24 hours at room temperature. In further embodiments, enough of the first colorant diffuses into the substrate to impart the substrate with a visible indicia in less than 4 hours at room temperature.

In still other embodiments, this invention includes an article comprising a polymeric layer (e.g., a high cross-linked polyethylene layer) having a surface and a subsurface portion. At least one image is printed on the surface by an ink deposited onto the article. Once the solvent has evaporated from the ink, the ink deposited on the article includes a thermoplastic resin, a urethane resin, a first colorant, and a second colorant. The article can be any item that includes at least some polymeric material. Examples include a wire with a polymeric insulation coating (e.g., a cross-linked polyethylene coating). The image is also embedded or marked into the subsurface portion by a portion of the first and the second colorant that has diffused into the polymeric layer. Optionally, the inkjet ink deposited on the surface further includes a third colorant (e.g., a pigment).

Exemplification

The following examples are not intended to be limiting in any way. The inks of the present invention were tested in accordance with Society for Automotive Engineers testing procedures. Included in the testing were chemical and abrasion resistance tests. The abrasion test included depositing the ink onto a polymeric wire substrate and wiping ten times with a pink pearl eraser using a force of 31 Newtons. The chemical resistance test included depositing the ink onto a polymeric wire substrate and immersing the wire into a fluid for 10 minutes, followed by two wipes of a paper towel with slight pressure. The fluids used in the chemical resistant test includes diesel fuel, gear and engine oil, antifreeze fluid, hydraulic fluid, and gasoline. In addition, polymeric materials were imprinted with the ink and stored at various temperatures (e.g., 60° C. or 150° C.) for various periods of time (e.g., from between a few hours to a few weeks) to observe how well the indicia of the ink withstood temperature and to gauge how long the markings would remain discernable. The acceptance criteria in all cases was that the legend printed on the substrate be legible after each test.

EXAMPLE 1

The following components were mixed together to form an ink composition:

| Component | Wt. % |
|---|---|
| Methyl Ethyl Ketone | 72.77 |
| Ethanol | 5.00 |
| Zonyl ™ FSO | 0.10 |
| Tetrabutylammonium Nitrate | 1.50 |
| Neocryl ™ B-814 | 4.75 |
| NeoRez ™ U351 | 11.88 |
| Oil Black 860 | 2.00 |
| Orasol ™ Black RLI | 2.00 |

The ink was filtered through a 1-micron filter. The ink had a viscosity of about 3.64 centipoise. Conductivity was about 1000 microsiemens per centimeter. A print was made with the ink, and it passed all the chemical resistance tests after aging for about 1 hour at 60° C. Prints made with this ink were still legible after aging at 60° C. for at least 5 days. The print became difficult to read after aging overnight at 150° C.

EXAMPLE 2

The following components were mixed together to form an ink composition:

| Component | Wt. % |
|---|---|
| Methyl Ethyl Ketone | 65.32 |
| Ethanol | 5.0 |
| Zonyl ™ FSO | 0.10 |
| Tetrabutylammonium Nitrate | 1.5 |
| Neocryl ™ B-814 | 4.0 |
| Neorez ™ U-351 | 9.38 |
| 20% carbon black dispersion | 10.7 |
| Orasol ™ RLI | 2.0 |
| Oil Black 860 | 2.0 |

The ink was filtered through a 1-micron filter. The ink had a viscosity of about 4.6 centipoise and a conductivity of about 1040 microsiemens per centimeter. The ink passed all chemical resistant tests after aging for 2 hours at 60° C. The ink passed the abrasive resistance test, even after the wire had been flexed. The print remained legible after aging at both a temperature of 60° C. and 150° C.

Equivalents

While this invention has been particularly shown and described with references to preferred embodiments thereof, it will be understood by those skilled in the art that various changes in form and details may be made therein without departing from the scope of the invention encompassed by the appended claims.

What is claimed is:

1. An inkjet ink composition, comprising:
   a) a solvent;
   b) a thermoplastic resin;
   c) a urethane resin;
   d) a first colorant and a second colorant, wherein the first colorant is solvent black 3 and these second colorant is less oleophilic than the first colorant; and
   e) a wetting agent that is a fluorinated surfactant.

2. The inkjet ink composition of claim 1, wherein the ink composition has an average particle size of less than 1 micrometer.

3. The inkjet ink composition of claim 1, wherein the ink composition has a viscosity of less than 20 centipoise at room temperature.

4. The inkjet ink composition of claim 1, wherein the amount of solvent in the inkjet ink composition is in the range of between 50 percent and 90 percent by weight of the inkjet ink composition.

5. The inkjet ink composition of claim 1, wherein the solvent includes at least one member selected from the group consisting of methanol, ethanol, propanol, an ethylene glycol monomethyl ether, an ethylene glycol monoethyl ether, a propylene glycol monomethyl ether, a propylene glycol monoethyl ether, a ketone having 3 to 8 carbon atoms, an acetate, and water.

6. The inkjet ink composition of claim 1, wherein the amount thermoplastic resin in the inkjet ink composition is in the range of between 2 percent and 15 percent by weight of the inkjet ink composition.

7. The inkjet ink composition of claim 1, wherein the thermoplastic resin includes at least one member selected from the group consisting of a nitrocellulose resin and an acrylic resin.

8. The inkjet ink composition of claim 1, wherein the amount of urethane resin in the inkjet ink composition is in the range of between 40 percent and 150 percent by weight of the thermoplastic resin.

9. The inkjet ink composition of claim 1, wherein the amount of first colorant in the inkjet ink composition is in the range of between 0.5 percent and 10 percent by weight of the inkjet ink composition.

10. The inkjet ink composition of claim 1, wherein the amount of second colorant in the inkjet ink composition is in the range of between 0.5 percent and 10 percent by weight of the inkjet ink composition.

11. The inkjet ink composition of claim 1, wherein the second colorant includes at least one member selected from the group consisting of solvent black 27, solvent black 29, solvent black 34, solvent red 8, solvent red 122, solvent red 132, solvent red 218, solvent blue 38, and solvent blue 70.

12. The inkjet ink composition of claim 1, further including a third colorant.

13. The inkjet ink composition of claim 12, wherein the third colorant is a pigment.

14. The inkjet ink composition of claim 12, wherein the amount of third colorant in the inkjet ink composition is in the range of between 0.5 percent and 10 percent by weight of the inkjet ink composition.

15. The inkjet ink composition of claim 12, wherein the pigment is carbon black.

16. The inkjet ink composition of claim 1, further including a conductivity agent.

17. The inkjet ink composition of claim 16, wherein the ink composition has a conductivity in the range of from 500 to 2,000 microsiemens per centimeter.

18. The inkjet ink composition of claim 16, wherein the conductivity agent includes at least one member selected from the group consisting of tetrabutyl ammonium nitrate, tetrabutyl ammonium hexafluorophosphate, and potassium thiocyanate.

19. The inkjet ink composition of claim 16, wherein the amount of conductivity agent in the inkjet ink composition is in the range of between 0.2 percent and 3 percent by weight of the inkjet ink composition.

20. The inkjet ink composition of claim 1, wherein the amount of wetting agent in the inkjet ink composition is in the range of between 0.5 percent and 1.5 percent by weight of the inkjet ink composition.

21. The inkjet ink composition of claim 1, wherein the solvent includes ethanol and methyl ethyl ketone, and the amount of solvent in the inkjet ink composition is in the range of between 65 percent and 85 percent by weight of the inkjet ink composition;
the thermoplastic resin includes an acrylic resin having a molecular weight average of no greater than 75,000 and the amount of thermoplastic resin in the inkjet ink composition; is in the range of between 2 percent and 6 percent by weight of the inkjet ink composition;
the amount of urethane resin in the inkjet ink composition is in the range of between 50 percent and 100 percent by weight of the thermoplastic resin;
the amount of first colorant in the inkjet ink composition is in the range of between 1 percent and 4 percent by weight of the inkjet ink composition;
the second colorant includes at least one member selected from the group consisting of solvent black 27, solvent black 29, solvent black 34, solvent red 8, solvent red 122, solvent red 132, solvent red 218, solvent blue 38, and solvent blue 70, and the amount of second colorant in the inkjet ink composition is in the range of between 1 percent and 4, percent by weight of the inkjet ink composition; and
further including a pigment in the amount of between 0.5 percent and 10 percent by weight of the inkjet ink composition.

22. The inkjet ink composition of claim 21, further including a conductivity agent, wherein the amount of conductivity agent in the inkjet ink composition is in the range of between 0.2 percent and 3 percent by weight of the inkjet ink composition.

23. A method of applying indicia to a substrate, wherein the substrate is a portion of a polymeric insulation of a flexible wire, comprising the steps of:
a) directing a stream of ink droplets to the substrate, wherein said ink droplets include a solvent, a thermoplastic resin, a urethane resin, a first colorant, and a second colorant, wherein the first colorant is solvent black 3 and the second colorant is less oenophile than the first colorant; and
b) directing the stream electronically so that the droplets form at least one printed image on the substrate, thereby applying indicia to the substrate.

24. The method of claim 23, wherein the amount of first colorant in the inkjet ink composition is in the range of between 0.5 percent and 10 percent by weight of the inkjet ink composition.

25. The method of claim 23, wherein the amount of second colorant in the inkjet ink composition is in the range of between 0.5 percent and 10 percent by weight of the inkjet ink composition.

26. The method of claim 23, wherein the second colorant includes at least one member selected from the group consisting of solvent black 27, solvent black 29, solvent black 34, solvent red 8, solvent red 122, solvent red 132 solvent red 218, solvent blue 38, and solvent blue 70.

27. The method of claim 23, further including a third colorant.

28. The method of claim 27, wherein the third colorant is a pigment.

29. The method of claim 28, wherein the amount of third colorant in the inkjet ink composition is in the range of between 0.5 percent and 10 percent by weight of the inkjet ink composition.

30. The method of claim 28, wherein the pigment is carbon black.

31. The method of claim 23, further including a conductivity agent.

32. An article comprising:
a) a polymeric layer that includes cross-linked polyethylene, with a surface and a subsurface portion;
b) an image printed on the surface through the deposition of an inkjet ink, wherein the inkjet ink deposited on the surface includes a thermoplastic resin, a urethane resin, a first colorant, and a second colorant; and
c) the image marked in the subsurface portion by diffusion of the first colorant and the second colorant into the polymeric layer.

33. The article of claim 32, wherein the inkjet ink deposited on the surface further includes a third colorant.

34. The article of claim 33, wherein the third colorant is a pigment.

35. An inkjet ink composition, comprising:
a) a solvent;
b) a thermoplastic; resin
c) a urethane resin;
d) a first colorant, wherein the first colorant is selected from the group consisting of solvent black 5, solvent black 7, solvent orange 22, solvent yellow 14, solvent yellow 16, solvent yellow 29, solvent yellow 30, solvent yellow 56, solvent blue 5, solvent red 3, solvent red 18, solvent red 24, solvent red 27, solvent red 35, and red 49, and wherein the second colorant is less oleophilic than the first colorant; and
e) a wetting agent that is a fluorinated surfactant.

36. A method of applying indicia to a substrate, wherein the substrate is a portion of a polymeric insulation of a flexible wire, comprising the steps of:
a) directing a stream of ink droplets to the substrate, wherein said ink droplets include a solvent, a thermoplastic resin, a urethane resin, a first colorant, and a second colorant, wherein the first colorant is selected from the group consisting of solvent black 5, solvent black 7, solvent orange 22, solvent yellow 14, solvent yellow 16, solvent yellow 29, solvent yellow 30, solvent yellow 56, solvent blue 5, solvent red 3, solvent red 18, solvent red 24, solvent red 27, solvent red 35, and solvent red 49, and wherein the second colorant is less oleophilic than the first colorant; and b) directing the stream electronically so that the droplets form at least one printed image on the substrate, thereby applying indicia to the substrate.

37. An inkjet ink composition, comprising:
a) a solvent;
b) a thermoplastic resin;
c) a urethane resin;
d) a first colorant and a second colorant, wherein the first colorant is selected from the group consisting of solvent black 3, solvent black 5, solvent black 7, solvent orange 22, solvent yellow 14, solvent yellow 16, solvent yellow 29, solvent yellow 30, solvent yellow 56, solvent blue 5, solvent red 3, solvent red 18, solvent red 24, solvent red 27, solvent red 35, and solvent red 49, and wherein the second colorant is more polar than the first colorant and
e) a wetting agent that is a fluorinated surfactant.

38. A method of applying indicia to a substrate, wherein the substrate is a portion of a polymeric insulation of a flexible wire, comprising the steps of:
a) directing a stream of ink droplets to the substrate, wherein said ink droplets include a solvent, a thermoplastic resin, a urethane resin, a first colorant, and a second colorant, wherein the first colorant is selected from the group consisting of solvent black 3, solvent black 5, solvent black 7, solvent orange 22, solvent yellow 14, solvent yellow 16, solvent yellow 29, solvent yellow 30, solvent yellow 56, solvent blue 5, solvent red 3, solvent red 18, solvent red 24, solvent red 27, solvent red 35, and solvent red 49, and wherein the second colorant is more polar than the first colorant; and b) directing the stream electronically so that the droplets form at least one printed image on the substrate, thereby applying indicia to the substrate.

39. An inkjet ink composition, comprising:
a) a solvent;
b) a thermoplastic resin;
c) a urethane resin;
d) a first colorant and a second colorant, wherein the first colorant is solvent black 3 and the second colorant is less oleophilic than the first colorant; and
e) at least one conductivity agent selected from the group consisting of tetrabutyl ammonium nitrate, tetrabutyl ammonium hexafluoro phosphate, and potassium thiocyanate, and wherein the ink composition has a conductivity in the range from 500 to 2,000 microsiemens per centimeter.

* * * * *

UNITED STATES PATENT AND TRADEMARK OFFICE
CERTIFICATE OF CORRECTION

| | |
|---|---|
| PATENT NO. | : 7,432,316 B2 |
| APPLICATION NO. | : 10/980753 |
| DATED | : October 7, 2008 |
| INVENTOR(S) | : Rick A. Elmer et al. |

Page 1 of 1

It is certified that error appears in the above-identified patent and that said Letters Patent is hereby corrected as shown below:

Claim 1, column 10, line 19, delete "these" and insert --the--.

Claim 23, column 11, line 66, delete "oenophile" and insert --oleophilic--.

Signed and Sealed this

Twenty-fourth Day of February, 2009

JOHN DOLL
*Acting Director of the United States Patent and Trademark Office*